June 18, 1935.　　　　R. STOVER　　　　2,005,245

PACKAGED CONFECTION

Filed May 28, 1934

INVENTOR
Russell Stover
BY
ATTORNEY

Patented June 18, 1935

2,005,245

UNITED STATES PATENT OFFICE 2,005,245

PACKAGED CONFECTION

Russell Stover, Kansas City, Mo.

Application May 28, 1934, Serial No. 727,909

3 Claims. (Cl. 206—56)

My invention relates to packaged confections, and more particularly to a special packaged ice cream sundae adapted to be taken to the home and the assembly ejected to form an ice cream sundae.

At present ice cream can be bought in bulk or in packages for use in the home. This ice cream is plain ice cream. Most people prefer to eat ice cream with some sort of fruit dressing, topping or flavoring. The sale of plain ice cream for use in the home has been more or less limited due to this preference.

One object of my invention is to provide a special assembly in package form adapted to form ice cream sundaes in the home.

Another object of my invention is to provide a novel package confection.

Other and further objects of my invention will appear from the following description.

In the accompanying drawing, which forms part of the instant specification, and which is to be read in conjunction therewith, and in which like reference numerals are used to indicate like parts in the various views.

Figure 1:
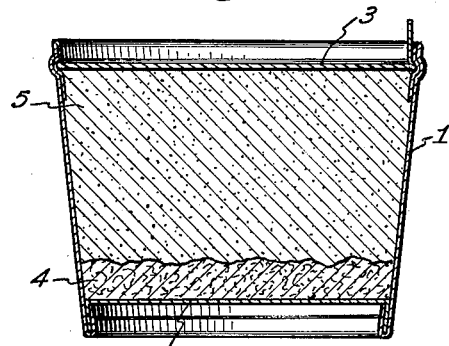
Fig. 1 is a sectional view of an assembly embodying one mode of carrying out my invention.
Figure 2:
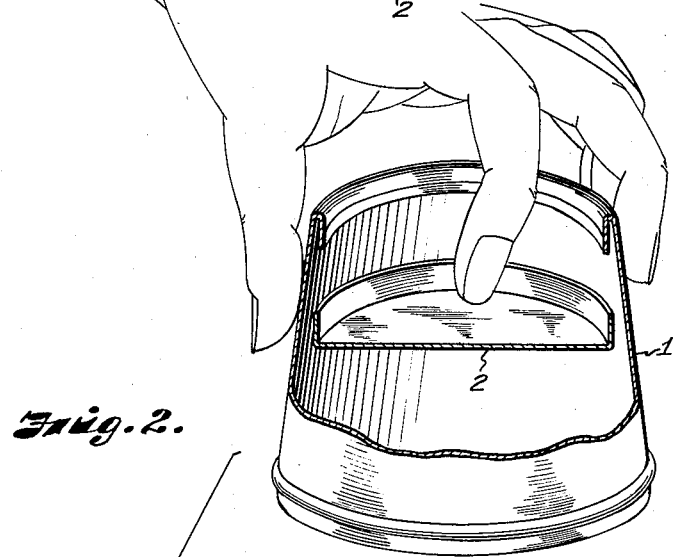
Fig. 2 is a perspective view showing the sundae formed by means of my invention.
Figure 2:
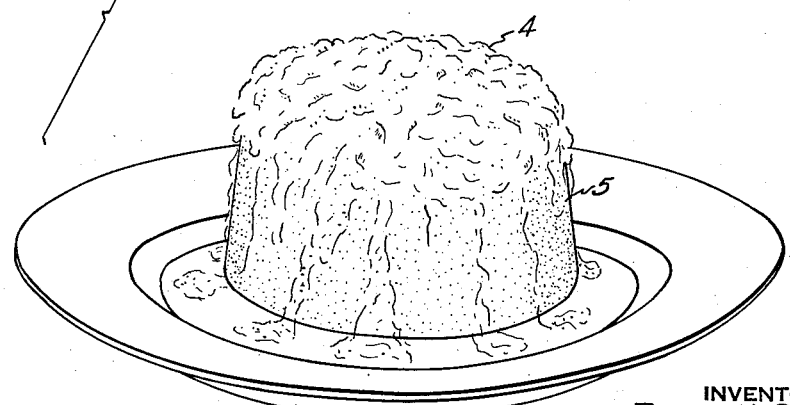

In general, my invention contemplates the use of a carton or receptacle having a removable top and a movable bottom. In the bottom of this receptacle I place a confectionery topping, such as raspberry, strawberry, pineapple and the like. Upon this topping I place the ice cream after which the cover is applied. The package is thus formed and stored in the usual cold cabinet from which it is dispensed.

The package is taken to a home in which it is desired to serve a sundae. The cover is removed, the package inverted and the movable bottom pressed. This ejects the ice cream and the topping being released will flow over the ice cream forming an ice cream sundae.

More particularly, referring now to the drawing, the receptacle 1 may be made out of any suitable material as for example water-proofed paper, cardboard or the like. The receptacle has a movable bottom 2 and a removable closure 3. Adjacent the bottom is a quantity of a confectionery topping 4.

The topping must be such that it will not freeze within the cold cabinet. If the topping freezes it will not flow over the ice cream to form the sundae. Accordingly, I dissolve a sufficient amount of sugar in the topping to lower its freezing point to insure that it will not freeze. In preparing the topping I heat sugar and water to 212° F. Due to the fact that sugar is dissolved in the water the boiling point of the water is raised so that it will not boil at 212°. I then add a quantity of tartaric acid while holding the temperature of the mixture at 212° F. for thirty minutes. The action of the tartaric acid on the sugar is to convert the sucrose to levulose or dextrose, which are inverts. I then make a pH test for acid and then neutralize the acid with bicarbonate of soda. The sugar inverts are then used to make the syrup of any density, to which fruit, such as raspberry, strawberry, pineapple and the like, or any other suitable flavor, may be added. The sugar inverts prevent granulation, and sufficient sugar inverts are added to lower the freezing point of the topping.

Upon the topping I place a quantity of ice cream 5 which may be of any desired flavor. The cover 3 is then secured and the package is ready for sale. The packages are stored in a cold cabinet, each package being of sufficient size to make one ice cream sundae such as obtained at soda fountains and the like.

It is believed that the operation and use of my package will be clear from the foregoing description. It will be observed that I have accomplished the objects of my invention. I have provided a novel assembly which will enable ice cream sundaes to be served in the home, either as dessert, at parties or the like. If desired, ice cream sodas may be made with my invention. The contents of the package may be ejected into a glass and carbonated water added to make an ice cream soda.

Having thus described my invention, what I claim is:

1. A package comprising a receptacle, a minor quantity of confectionery topping in the bottom of said receptacle and a major quantity of frozen comestible superposed upon said topping, said topping having such a low freezing point that it will remain flowable during normal temperatures of storage and dispensing of the package.

2. A package comprising a receptacle, a minor quantity of a non-frozen confectionery topping in the bottom of said receptacle and a major quantity of frozen comestible superposed upon said topping, said topping having a low freezing point such that it will remain flowable during the low temperatures of storage and dispensing of the package.

3. A package having a removable closure and removable bottom, comprising in combination a non-frozen confectionery topping in the bottom of the package and a frozen comestible superposed on said non-frozen confection, said topping having such a low freezing point that it will remain flowable during normal temperatures of storage and dispensing of the package, the construction being such that upon the removal of the closure the package is adapted to be inverted and the bottom moved to eject the assembly, whereby the non-frozen confection is adapted to spread over the frozen comestible, forming a sundae or the like.

RUSSELL STOVER.